(12) United States Patent
Mackey et al.

(10) Patent No.: US 12,113,252 B2
(45) Date of Patent: Oct. 8, 2024

(54) DETECTING A FAULT CONDITION IN A FUEL CELL SYSTEM

(71) Applicant: ZeroAvia, Inc., Hollister, CA (US)

(72) Inventors: Bob L. Mackey, San Jose, CA (US); Valery Miftakhov, San Carlos, CA (US); Callum Woods Larson Ritchie, Gilroy, CA (US); Christian Bailey, Palo Alto, CA (US); Kevin-Patxi Le Bras, Santa Cruz, CA (US)

(73) Assignee: ZEROAVIA, INC., Hollister, CA (US)

( * ) Notice: Subject to any disclaimer, the term of this patent is extended or adjusted under 35 U.S.C. 154(b) by 71 days.

(21) Appl. No.: 17/744,471

(22) Filed: May 13, 2022

(65) Prior Publication Data

US 2023/0369616 A1 Nov. 16, 2023

(51) Int. Cl.
*H01M 8/04664* (2016.01)

(52) U.S. Cl.
CPC .... *H01M 8/04671* (2013.01); *H01M 2250/20* (2013.01)

(58) Field of Classification Search
CPC ............ H01M 8/04671; H01M 2250/20
See application file for complete search history.

(56) References Cited

U.S. PATENT DOCUMENTS

| | | | |
|---|---|---|---|
| 7,687,176 B2 | 3/2010 | Roscoe et al. ................. | 429/34 |
| 11,757,117 B2 * | 9/2023 | Zaag ................. | H01M 8/04559 |
| | | | 429/432 |
| 2004/0104342 A1 * | 6/2004 | Yamada ................. | H01J 49/04 |
| | | | 250/288 |
| 2006/0083961 A1 | 4/2006 | Piccirillo et al. ....... | H01M 8/04 |
| 2006/0127729 A1 * | 6/2006 | Roscoe ................. | H01M 8/023 |
| | | | 429/514 |
| 2006/0141299 A1 | 6/2006 | Piccirillo ................. | H01M 8/04 |
| 2009/0252998 A1 * | 10/2009 | Saloka ................. | H01M 8/0202 |
| | | | 429/524 |
| 2010/0323263 A1 * | 12/2010 | Katano ............. | H01M 8/04753 |
| | | | 429/444 |
| 2013/0071765 A1 | 3/2013 | Bauer ..................... | H01M 8/04 |
| 2014/0176145 A1 | 6/2014 | Park et al. ............. | H01M 8/04 |
| 2018/0198143 A1 | 7/2018 | Piccirillo et al. ... | H01M 8/2425 |

FOREIGN PATENT DOCUMENTS

| | | | | |
|---|---|---|---|---|
| CN | 107607207 | | 1/2018 | ................ G01J 5/10 |
| JP | 2008-523561 | | 7/2008 | ............ H01M 8/04 |
| JP | 2008166131 | A * | 7/2008 | ............ H01M 8/04 |
| JP | 2015032421 | A * | 2/2015 | .......... H01M 8/2465 |

OTHER PUBLICATIONS

Machine Translation JP2008166131A (Year: 2008).*
Machine translation JP2015-32421A (Year: 2015).*

* cited by examiner

*Primary Examiner* — Victoria H Lynch
(74) *Attorney, Agent, or Firm* — HAYES SOLOWAY P.C.

(57) ABSTRACT

A fuel cell system having at least one fuel cell having an external surface; and one or more of audio, image, or strain sensors external to the fuel cell surface, configured for detecting a change in the external surface of the fuel cell indicative of a fault condition. The at last one sensor may include a visual camera, an IR camera, an IR detector, or a UV-responsive camera, or an ultrasound transducer, a piezo-electric sensor and a vibration sensor, or a surface acoustic wave detector, or a mass spectrometer.

13 Claims, 6 Drawing Sheets

DETECTING A FAULT CONDITION IN A FUEL CELL SYSTEM

FIELD OF THE DISCLOSURE

The present disclosure generally relates to detecting a fault condition in a fuel cell system. The disclosure has particular utility in detecting a fault condition in a hydrogen fuel cell system for aircraft and will be described in connection with such utility, although other utilities are contemplated.

BACKGROUND OF THE DISCLOSURE

A fuel cell is an electrochemical device that converts chemical energy produced by a reaction directly into electrical energy. A typical hydrogen fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

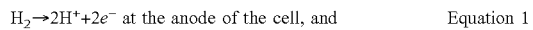

$H_2 \rightarrow 2H^+ + 2e^-$ at the anode of the cell, and  Equation 1

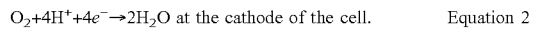

$O_2 + 4H^+ + 4e^- \rightarrow 2H_2O$ at the cathode of the cell.  Equation 2

A typical hydrogen fuel cell produces a terminal voltage near one volt DC. To produce higher voltages, several fuel cells are assembled together to form an arrangement called a fuel cell stack, an arrangement in which the fuel cells are electrically coupled together in series to form a higher DC voltage (a voltage near 100 volts DC, for example) and to provide more power.

A typical fuel cell stack may include flow plates (graphite composite or metal plates, as examples) that are stacked one on top of the other, and each plate may be associated with more than one fuel cell of the stack. The plates may include various surface flow channels and orifices to, as example, route the reactants and products through the fuel cell stack. Several PEMs (each one being associated with a particular fuel cell) may be dispersed throughout the stack between the anodes and cathodes of the several fuel cells. Catalyst layers and electrically conductive gas diffusion layers (GDLs) may be located on each side of each PEM to form the anode and cathodes of each fuel cell. In this manner, reactant gases from each side of the PEM may leave the flow channels and diffuse through the catalyst layers and GDLs to reach the PEM.

Referring to FIG. 1, a typical hydrogen fuel cell 10 comprises a housing 12 containing an anode 14, and a cathode 16 sandwiching a proton exchange membrane 18. A hydrogen fuel inlet 20 and a hydrogen recycling outlet 22 is provided on the anode side of the housing 12. An oxygen inlet 24 and a reaction product, i.e., water outlet 26 is provided on the cathode side of the housing 12. The anode side and cathode side of the membrane 18 are coated with suitable reaction catalysts 19A, 19B.

Anodic reaction according to Equation 1 as described above occurs at the anode side of the cell, while a cathodic reaction as described in Equation 2 occurs at the cathode side of the cell providing a flow of electricity 28.

The fuel cell stack is one of many components of a typical fuel cell system which includes various other components and subsystems, such as a cooling subsystem, a cell voltage monitoring subsystem, a control subsystem, a power conditioning subsystem, a reformer subsystem, a busbar subsystem, etc. The particular design of each of these subsystems is a function of the application the fuel cell system serves.

SUMMARY OF THE DISCLOSURE

During the lifetime of the fuel cell system, there is a possibility that at least one component of the fuel cell system may fail and cause a fault condition (a low cell voltage or a high temperature, for example) in the system. Also, transient or developing fault conditions may occur during normal operation which degrades the performance of the system. Thus, there is a need to monitor a fuel cell and to diagnose a fault condition in a fuel cell system.

Disclosed is a method and system for monitoring and diagnosing a fault in a fuel cell system. More particularly, there is provided a fuel cell system comprising at least one fuel cell having an external surface; and one or more of audio, image, and/or strain sensors on or external to the fuel cell surface, configured for detecting changes, e.g., swelling, vibrating, temperature changes, sounds, etc., in or emanating from the external surface of said fuel cell indicative of a fault condition.

In one embodiment the sensors are selected from the group consisting of a visual spectrum camera, an IR camera, an IR sensor, and a UV-responsive camera. In such embodiment, a plurality of the cameras which preferably include fisheye lenses, are arranged so that a plurality of the external surfaces of the fuel cell substantially fill the field of view of the cameras.

In another embodiment the sensors are selected from the group consisting of an ultrasound transducer, a piezoelectric sensor, a vibration sensor and a surface acoustic wave detector. In such embodiment the sensors may be affixed or microfabricated within an external surface of the fuel cell.

In another embodiment, the sensor comprises a mass spectrometer sensor, and including at least one ionizing beam source directed toward the cell.

The sensors preferably are ruggedized and/or meet certain operating standards: e.g., temperature range that the sensors are functional, e.g., −45 deg C. to 125 deg C. If the sensors form the part of the fuel cell then DO160 standard is applicable. Also, the sensors may be configured to operate under exposure to cosmic rays.

In a preferred embodiment multiple sensors are disposed to detect multiple external surfaces of the fuel cell.

Preferably the fuel cell comprises a hydrogen fuel cell.

In another embodiment, one or more of the external surfaces of the fuel cell is patterned. The fuel cell may be a hydrogen fuel cell, or the fuel cell may be selected from the group consisting of a phosphoric acid fuel cell, a solid oxide fuel cell, a molten carbonate fuel cell, and an alkaline fuel cell.

In a particular embodiment the fault condition is associated with at least one of the following defective subsystems: a membrane, a cooling subsystem, a voltage monitoring system subsystem, a control subsystem, a power conditioning subsystem, a reformer subsystem and a busbar subsystem.

The present disclosure also provides a method for detecting a fault condition in a fuel cell which comprises providing a fuel cell system with one or more audio, image or strain sensors above described, activating the sensor(s), detecting changes in an external surface of the fuel cell and generating an alert signal when a change in the external surface is detected.

In one embodiment of the method, the sensor comprises a visual camera, an IR camera, an IR detector or a UV-camera.

In another embodiment of the method, the sensor comprises a piezoelectric sensor, a vibration sensor, a surface acoustic wave detector or a mass spectrometer sensor.

In yet another embodiment of the method, the sensor comprises an IR or ultrasound sensor, and includes the steps of directing infrared energy pulses into an interior of the fuel cell, and monitoring the external surface of said fuel cell for changes.

In yet another embodiment of the method the one or more sensors comprise a mass spectrometer sensor, and including the steps of directing an ionized beam toward the surface of the fuel cell, and detecting ionization products produced using the mass spectrometer sensor.

The present disclosure also provides an article comprising a computer readable storage medium storing instructions to cause a process-based system to: compare changes in at least one surface parameter of a fuel cell detected by an audio, image or strain sensor, and in response to said changes, determine whether said changes are caused by a fault condition in said fuel cell.

In a particularly preferred embodiment the fuel cell system as above described is employed to power an aircraft.

BRIEF DESCRIPTION OF THE DRAWINGS

Further features and advantages of the present disclosure will be seen from the following detailed description, taken in conjunction with the accompanying drawings, wherein like numerals dictate like parts, and wherein.

DETAILED DESCRIPTION

As used herein, the term "fuel cell" is intended to include an electrochemical cell that converts the chemical energy of a fuel (typically hydrogen) and an oxidizing agent (typically oxygen) into electricity through a pair of redox reactions. There are many types of fuel cells, but they all include an anode, a cathode, and an electrolyte that allows ions, usually positively hydrogen ions or protons, to move between two sides of the fuel cell. At the anode a catalyst causes the fuel to undergo oxidized reactions that generate ions, typically positively charged hydrogen ions, and electrons. The ions move from the anode to the cathode through the electrolyte. At the same time, electrons flow from the anode to the cathode through an external circuit, producing direct current electricity. At the cathode, another catalyst causes ions, electrons and oxygen to react, forming water in the case of a hydrogen fuel cell, and possibly other products. Fuel cells are classified by the type of electrolyte they use and by the difference in startup electrolyte they use.

The present disclosure has particular applicability to proton-exchange membrane hydrogen fuel cells, or so-called hydrogen fuel cells, although the disclosure is not limited to hydrogen fuel cells, and may be used with other fuel cells such as phosphoric acid fuel cells, solid oxide fuel cells, molten carbonate fuel cells, and alkaline fuel cells which are given as exemplary.

Figure 1:
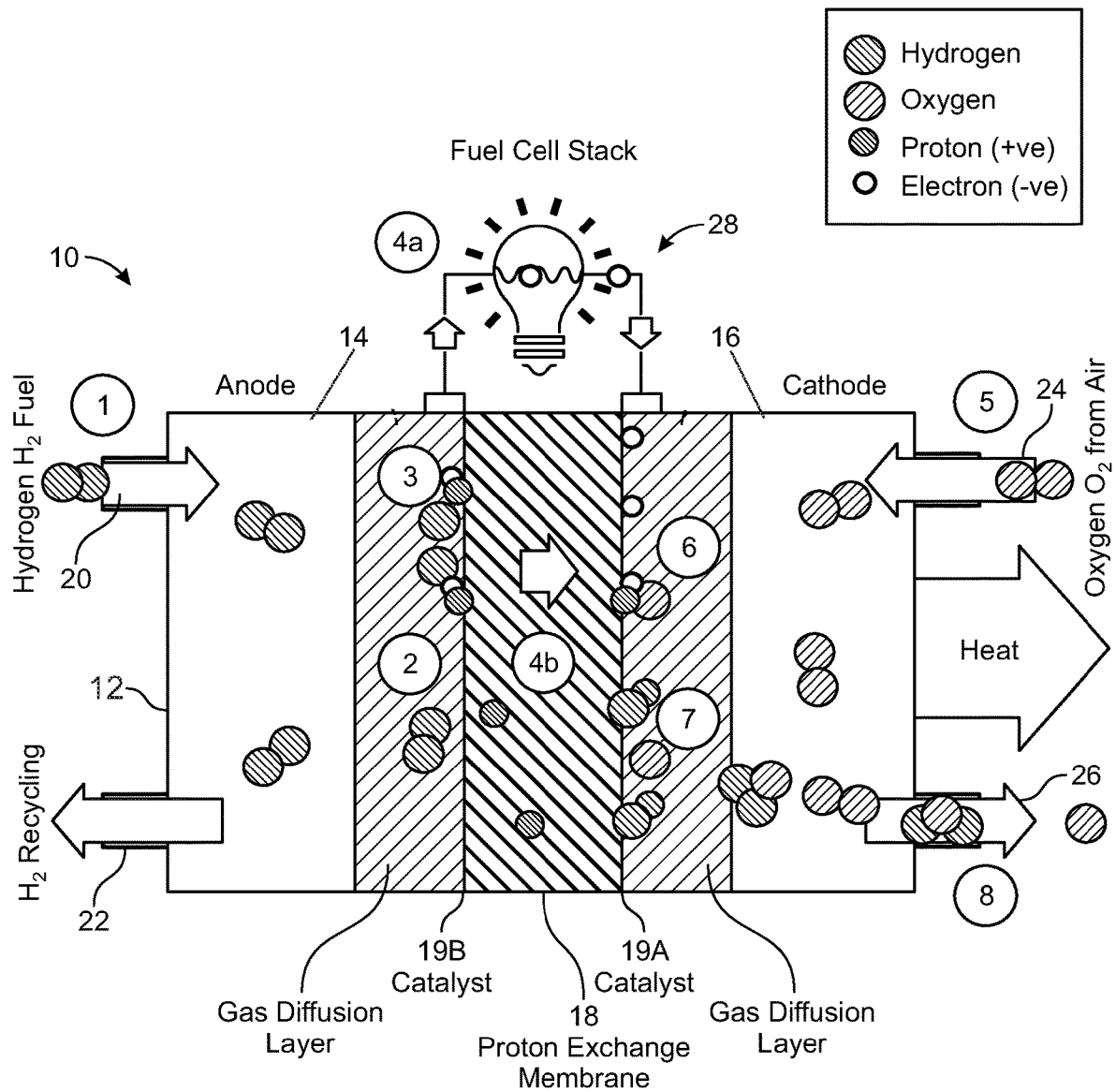
FIG. 1 is a cross sectional view depicting a conventional prior art fuel cell.
Figure 2:
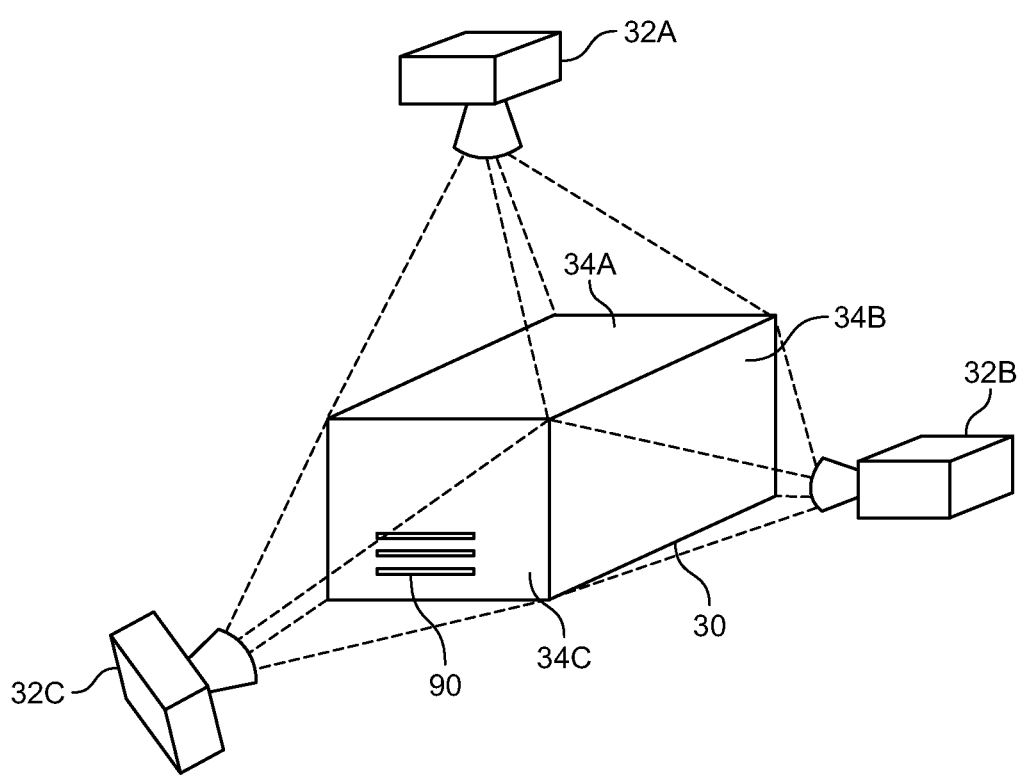
FIG. 2 is a schematic view of a fuel cell with a fault detector system in accordance with a first embodiment of the disclosure.

Referring to FIG. 2, there is illustrated a fuel cell stack 30 having one or more sensors 32A, 32B, 32C . . . external to the fuel cell surfaces 34A, 34B, 34C . . . respectively configured for detecting changes in external surfaces of the fuel cells. Sensors 32A, 32B, 32C . . . may comprise, for example, visual spectrum cameras, IR cameras, IR detectors, UV responsive cameras or the like. The sensors preferably are configured to detect changes in all six sides of the fuel cells. Only three sensors are shown for the convenience of illustration. It is understood however that detectors preferably are configured to observe all exterior surfaces of the fuel cell. That is to say sensors 32A, 32B, 32C . . . preferably are configured to cover the expanse of the entirety of one or more of surfaces 34A, 34B, 34C . . . of the fuel cell, where faults may be detected, and may include fisheye lenses or other means to ensure essentially full coverage, while minimizing spacing between the fuel cell and the sensors.

Figure 3:
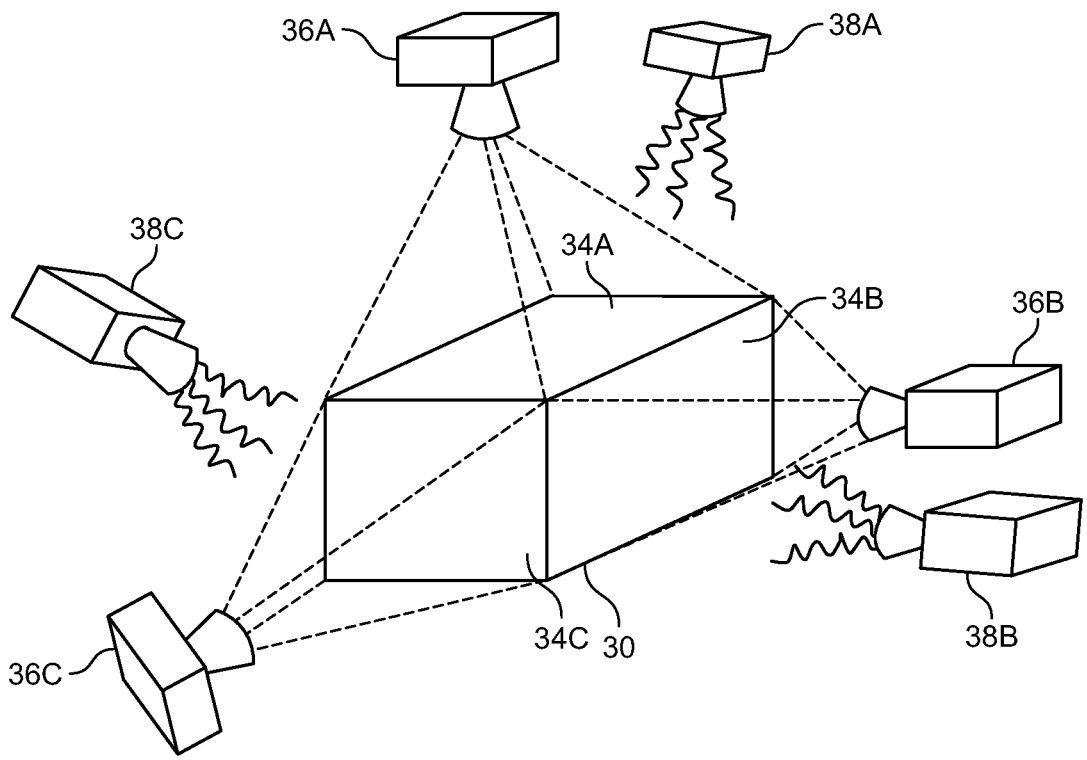
FIGS. 3 and 3A are views similar to FIG. 2, of second and third embodiments of the disclosure.
Figure 3A:
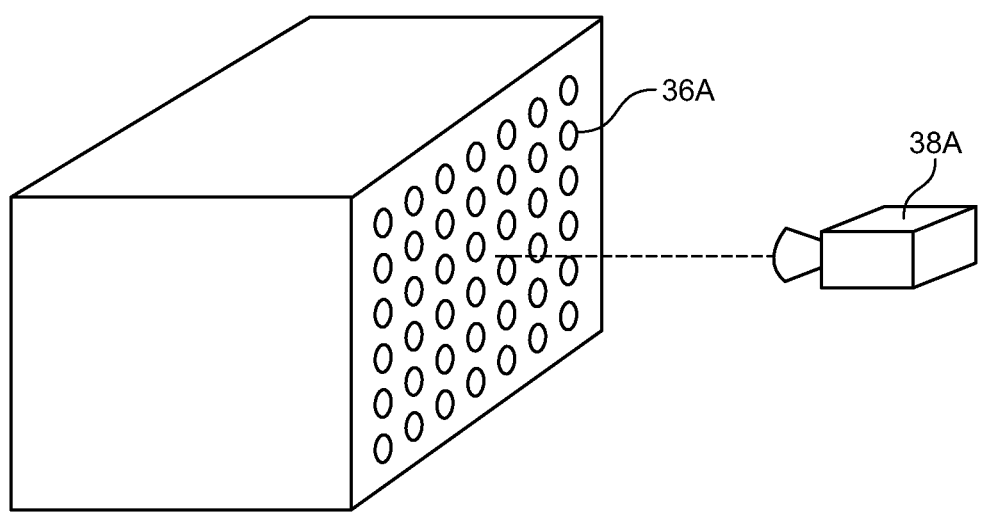

Referring to FIG. 3, in another embodiment, the sensors comprise ultrasound sensors 36A, 36B, 36C . . . configured to contact the fuel cell surfaces to detect sounds emanating from the fuel cell stack 30. Such sounds may comprise native sounds originating within the cells 30 or sounds induced, for example, by pulses, for example, from IR lasers 38A, 38B, 38C . . . directed toward the cells 30 (see FIG. 3A).

Figure 4:
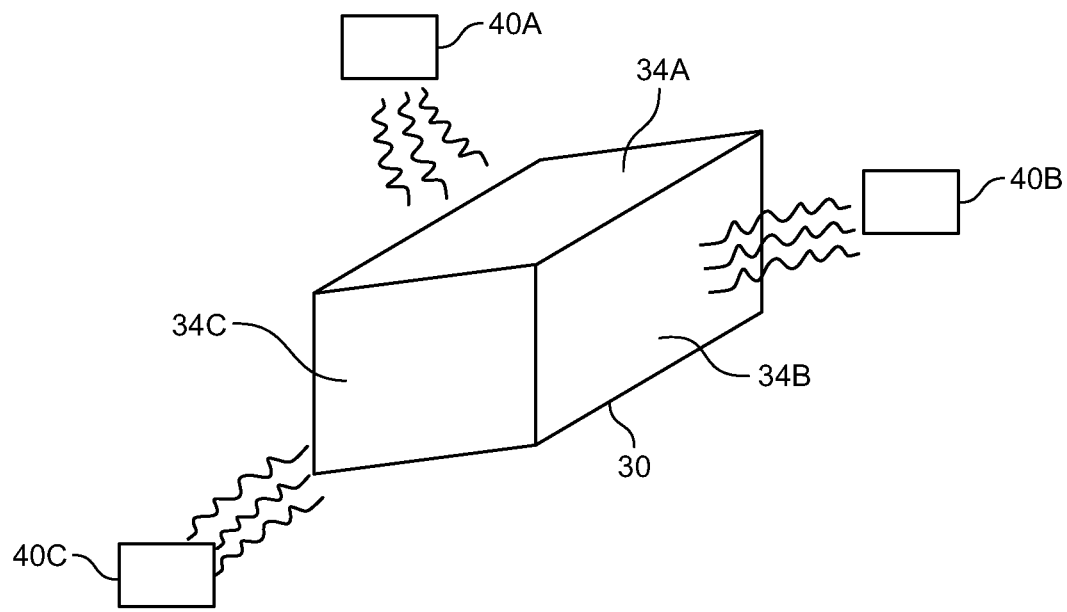
FIG. 4 is a view similar to FIG. 2, of a fourth embodiment of the disclosure.

Referring to FIG. 4, in yet another embodiment, the sensors comprise vibration sensors or surface acoustic wave detectors 40A, 40B, 40C . . . affixed to external surface(s) of the cell for detecting vibrations originating within the cells.

Figure 5:
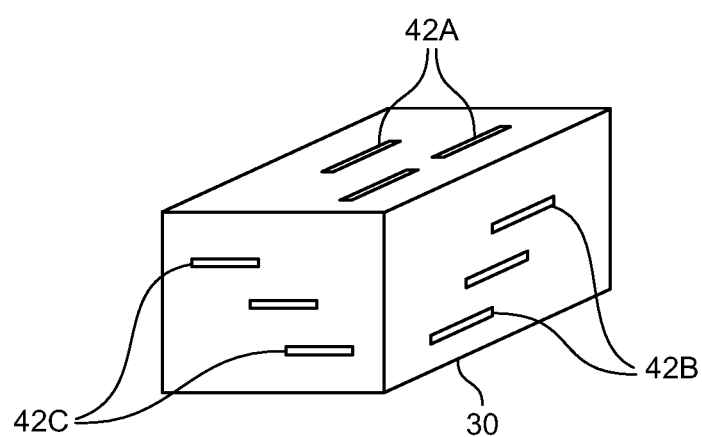
FIG. 5 is a view similar to FIG. 2, of a fifth embodiment of the disclosure.

Referring to FIG. 5 in still yet another embodiment, the sensors comprise piezo sensors 42A, 42B, 42C . . . affixed to or microfabricated within external surface(s) of the cells.

Figure 6:
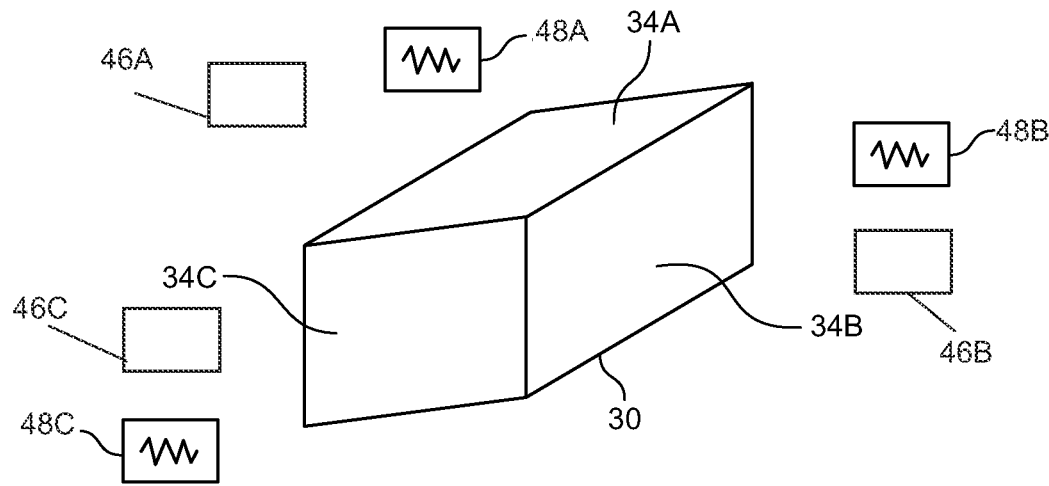
FIG. 6 is a view similar to FIG. 2, of a sixth embodiment of the disclosure.

In still yet another embodiment, illustrated in FIG. 6, the sensors comprise mass spectrometry sensors 46A, 46B, 46C . . . configured to detect changes in the surfaces of the cell or fluid leakage from the cell, under illumination of ionizing beam from ionizers 48A, 48B, 48C . . . external to the cell.

Figure 7:
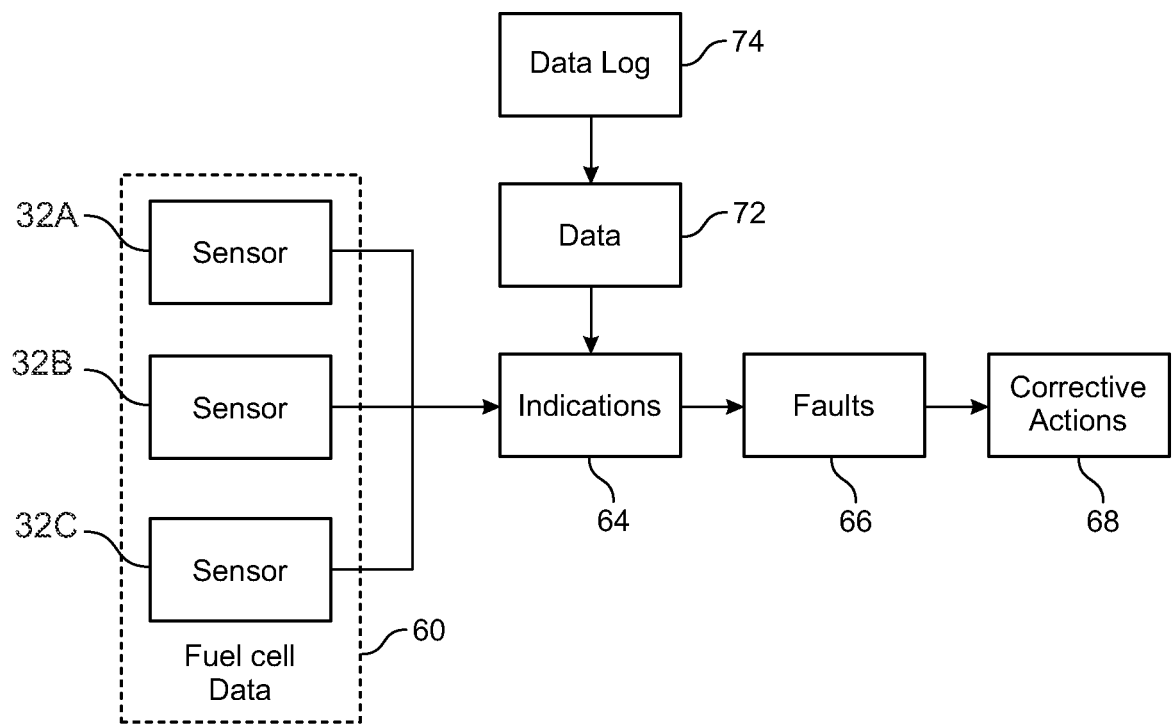
FIG. 7 is a block diagram illustrating the detection of faults in a fuel cell in accordance with the present disclosure.

FIG. 7 is a block diagram showing the use of fuel cell data 60 from, for example, sensors 32A, 32B, 32C . . . to generate indications 64 of faults 66 which can be used to flag and/or isolate the cause of a faulty function, abnormality or problem in the fuel cell 30. Fuel cell data 60 also can be used to determine corrective actions 68 and/or shutdown based on the isolated problem. Fuel cell data 60 is collected or generated by the fuel cell 30 also may include data 72 of past sensor outputs stored in data logs 74. Calculations can be made and include, for example, values based on sensor outputs and actuator and historical data stored in data logs 74, or based on other fuel cell data. For example, statistics can be used to determine cell performance, and/or trends in operation of the fuel cell 30 based on drifting values or changes in particular values or calculations for one or more of the sensor outputs over a period of time.

As so described, the present disclosure advantageously may be employed for monitoring hydrogen fuel cells and to diagnose a fault condition in a hydrogen fuel cell, including:

- Any combustion of $H_2$
- Leaking $H_2$
- Cold spots (where insufficient $O_2$ or $H_2$ is making it to membrane)
- Cold spots where $H_2$ is decompressed
- Hot spots (bubble or blockage in coolant channels)
- Input filter clogged
- Membrane distortion—measure of pressure difference across cell
- Insufficient oxygen or hydrogen reaching parts of the PEM
- Overheating and bulging Other faults such as deviation from normal or optimal temperature operating range which include:

- LTPEM (Low Temperature Proton Exchange Membrane)—70-85 deg C. (heat created by proton traveling through membrane), min 50 deg C.—so requires pre-heat
- HTPEM High Temperature Proton Exchange Membrane)—120-250 deg C., so requires pre-heat Also, poor interconnection of busbars and individual cells may lead to overheating. Existing systems for diagnosing fault connections in fuel cells typically employ thermocouples located at a few points in or on a fuel cell.

Various changes may be made without departing from the spirit and scope of the disclosure. For example, camera feed images and/or video incorporating Computer Vision algorithms (e.g., OpenCV) and/or algorithms trained using Machine learning (e.g., Linear regression, Logistic regression, Decision tree, SVM (Supervised Vector Machine) algorithms, Naive Bayes algorithms, KNN (Supervised Learning) algorithms, K-means (Unsupervised Learning) algorithms, Random forest algorithm, Dimensionality reduction algorithms, Gradient boosting algorithm, and AdaBoost algorithm). Video may be analyzed in hardware and/or efficient software, with the benefit that only changing data is stored and/or transmitted.

One embodiment may utilize machine learning algorithms to determine the most optimal control strategy and/or alerts based on a multitude of inputs. Also, we may utilize resulting models in real-time operation, or retrain the model for further updates throughout the useful life of the cell, or create predictive maintenance alerts to prevent unscheduled occurrences.

Another embodiment employs deterministic algorithms to determine an optimal control strategy and/or alerts based on a multitude of inputs, e.g.:

- Use a deterministic map to map inputs to outputs
- Employ fixed cameras to identify regions that map to specific inputs
- Employ conditional probability e.g., Bayesian analysis, or generate data
- Direct waves through liquid coolants to expose cell temperatures
- Incorporate computing devices to process and interpret signals from sensors
- Image fuel cells from multiple viewpoints to create 3D images
- Image electrical connections
- Employ cameras for detection of motion/distortion, interferometric or stereo amplification of cell surfaces
- Employ Euleran image motion amplification detect distortion such as pressure changes, also for rotating machinery
- Employ ultrasound surface piezo sensors to detect uneven heating, and/or of fluid leaks
- Position cameras or sensors so that they can "see" a whole side of a cell
- Detect water at an input side of the cathode side, optically with camera, such as by light scattered by droplets, or surface internal reflection changes, or total internal reflection detection
- Image or measure radiator faces to detect uneven heating, and/or low or partial fluid levels
- Image or measure radiator faces to detect a location of the refrigerant phase change
- Image or measure the anode wet side circulation loop to verify it is not too cool, which also may cause unwanted condensation
- Employ machine learning to identify correlations between physical parameters such as too wet, too dry, too hot, too cold and cell performance
- Time of flight acoustic measurement of speed of sound to determine the $H_2$ content
- Mass spec measurement The disclosure has particular utility for use in connection with fuel cells employed to power transportation equipment including airplanes, where fuel cell faults may strand passengers, or in extreme situations lead complete power loses resulting in crashes. In this regard, the disclosure may be applied to fault monitoring and alerting a pilot not only of internal fuel cell fault, but other faults of other aircraft components such as busbar with loose connections and overheating. For example, infrared camera connected to the fault detection system may detect a high temperature and disconnect relevant circuits automatically and/or warn the pilot or crew.

Figure 8:
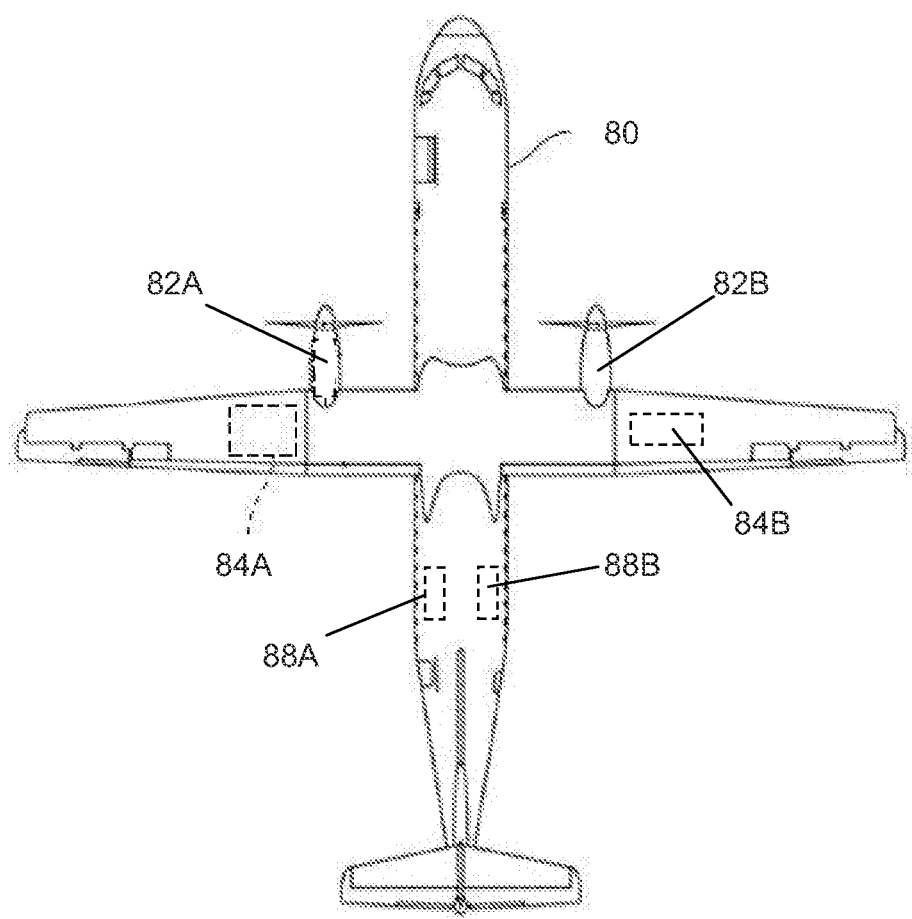
FIG. 8 is a schematic view of a fuel cell with a fault detector system installed on an airplane in accordance with the present disclosure.

FIG. 8 illustrates a fuel cell stack having a fault detection system in accordance with the present disclosure installed in an airplane. The airplane 80 includes electric motors 82A, 82B which are supplied with electrical power by two parallel fuel cell systems 84A, 84B for driving the electric motors 82A, 82B and for powering other instruments and subsystems, e.g., flaps, instrumentation, etc. of the plane. The plane also may have one or more electrical storage units 88A, 88B in the form of batteries or in the form of high power capacitors to temporarily store electrical energy arising in the fuel cell systems if this energy is not required to drive the motors 82A, 82B. The fuel cell systems are supplied with hydrogen and air (oxygen) by means of supply units (not shown). The hydrogen can thus be used to operate the fuel cell systems to power the airplane.

Various changes and advantages may be made in the above disclosure without departing from the spirit and scope thereof. For example, external surfaces of the fuel cells may be patterned (see FIG. 2, element 90) so that changes in surface conditions are more readily observable. Also, the system may employ machine learning or other image interpretation to suggest on-condition maintenance schedules or service requirements of the fuel cell stacks. Also, data gathered by the sensors may be logged for maintenance and/or regulatory requirements and/or sent to the pilot or crew, the Automated Flight Control System (AFCS), for autonomous flight, or stored and/or sent to telemetry-ground and/or other aircraft. Data gathered also may be utilized to optimize fuel cell control based on hydrogen remaining in the anode loop, to monitor hydrogen quality and/or optimize hydrogen concentration in the gas phase. Other embodiments may include a data transmission link to upload data from the aircraft and/or download models to the aircraft post-flight. Such embodiments may employ cloud processing of cross-fleet-of-aircraft data to incorporate fleet-wide learnings. Still other changes and advantages may be seen without departing from the spirit and scope of the disclosure.

The invention claimed is:

1. A fuel cell system comprising at least one fuel cell having an external surface; and
one or more sensors external to the fuel cell surface, configured for detecting a change in the external surface of said fuel cell indicative of a fault condition, wherein the one or more sensors are selected from the group consisting of an ultrasound transducer, and a combination of a mass spectrometer sensor and at least one ionizing beam source directed toward the fuel cell.

2. The system of claim 1, wherein a plurality of said sensors are arranged so that a plurality of the external surfaces substantially fill the field of view of the sensors.

3. The system of claim 1, wherein the sensors are affixed to or microfabricated within the external surface of the fuel cell.

4. The system of claim 1, wherein multiple of said sensors are disposed to detect multiple external surfaces of the fuel cell.

5. The system of claim 1, wherein the fuel cell comprises a hydrogen fuel cell.

6. The system of claim 1, wherein one or more of the external surfaces of the fuel cell is patterned.

7. The system of claim 1, wherein the fuel cell is selected from the group consisting of a phosphoric acid fuel cell, a solid oxide fuel cell, a molten carbonate fuel cell, and an alkaline fuel cell.

8. The system of claim 1, wherein the fault condition is associated with at least one of the following defective subsystems: a membrane, a cooling subsystem, a voltage monitoring system subsystem, a control subsystem, a power conditioning subsystem, a reformer subsystem, or a busbar subsystem.

9. A fuel cell powered aircraft comprising at least one electric motor, and a fuel cell system as claimed in claim 1.

10. The fuel cell powered aircraft of claim 9, wherein the fuel cell comprises a hydrogen fuel cell.

11. A method for detecting a fault condition in a fuel cell which comprises providing a fuel cell with one or more sensors external to a fuel cell surface, activating the one or more sensors, and generating an alert signal when a change in the external surface is detected, wherein the one or more sensors comprise ultrasound transducer sensors, and including the steps of directing infrared energy pulses into an interior of the fuel cell, and employing said one or more sensors to monitor the external surface of said fuel cell for changes.

12. A method for detecting a fault condition in a fuel cell which comprises providing a fuel cell with one or more mass spectrometer sensors external to a fuel cell surface, activating the sensors, directing an ionized beam toward a surface of the fuel cell, detecting ionization products produced using the one or more mass spectrometer sensors, and generating an alert signal when a change in the ionization products is detected.

13. An article comprising a computer readable storage medium storing instructions to cause a process-based system to:
collect data regarding characteristics of a surface of a fuel cell using one or more sensors selected from the group consisting of an ultrasound transducer, and a combination of a mass spectrometer sensor and at least one ionizing beam source directed toward the fuel cell,
compare said data to a standards data, and when changes in at least one surface are detected, determine whether said changes are caused by a fault condition in said fuel cell.

* * * * *